PROTECTIVE CIRCUIT FOR CATHODE RAY TUBES USING A SWITCH RESPONSIVE TO THE POWER SUPPLY TO CHANGE THE BIAS ON THE CATHODE RAY TUBE
Filed Sept. 9, 1964
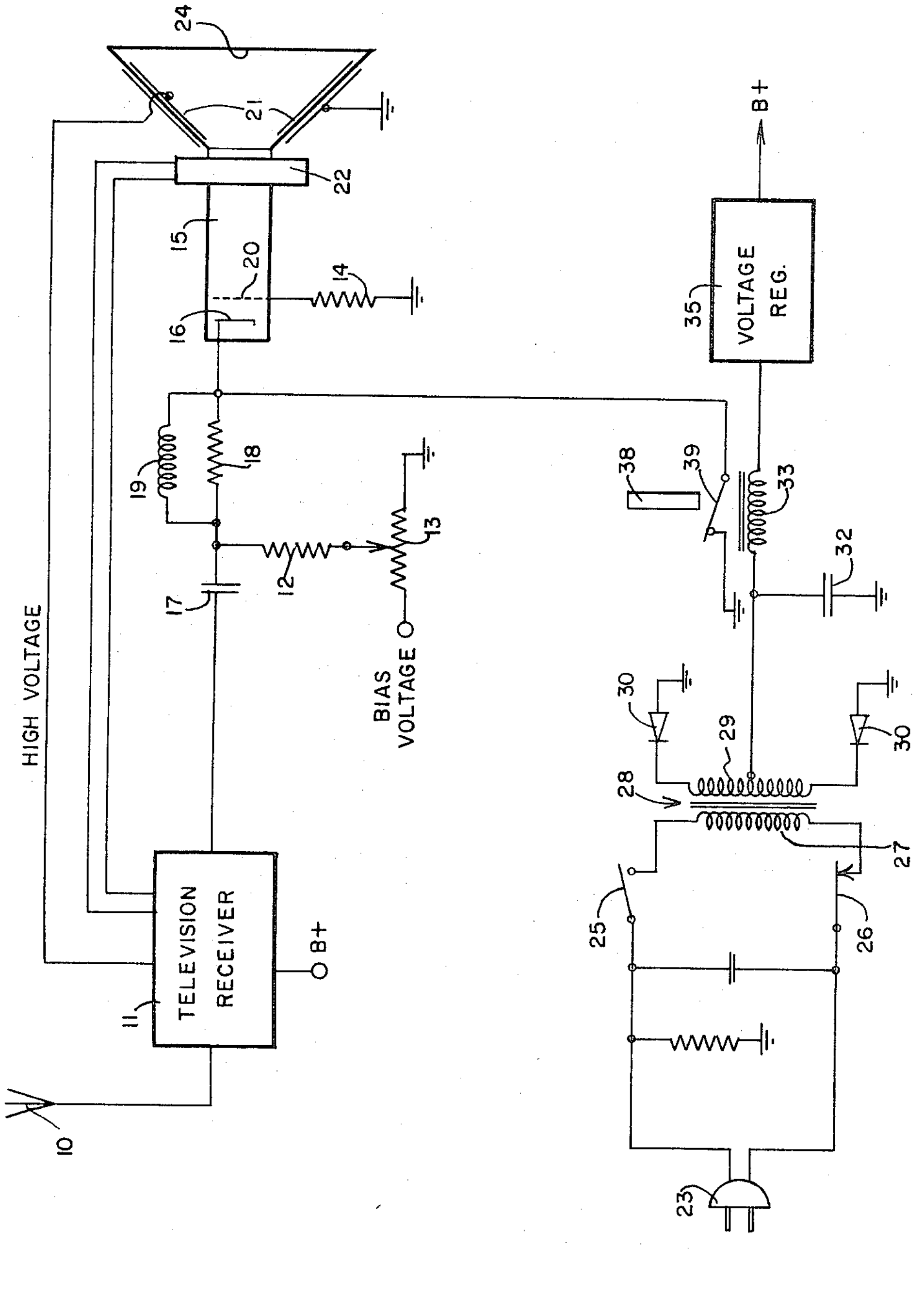
Inventor
LOWELL S. KONGABLE
DENNIS C. WALSTAD
BY Mueller and Aichele
ATTYS.

United States Patent Office 3,351,804
Patented Nov. 7, 1967

3,351,804

PROTECTIVE CIRCUIT FOR CATHODE RAY TUBES USING A SWITCH RESPONSIVE TO THE POWER SUPPLY TO CHANGE THE BIAS ON THE CATHODE RAY TUBE

Lowell S. Kongable, Prospect Heights, and Dennis C. Walstad, Franklin Park, Ill., assignors to Motorola, Inc., Franklin Park, Ill., a corporation of Illinois Filed Sept. 9, 1964, Ser. No. 395,115
7 Claims. (Cl. 315—20)

ABSTRACT OF THE DISCLOSURE

The system includes a circuit for biasing a cathode ray tube in a television receiver to an operating condition, and a switch coupled between the receiver power supply and the grid and cathode of the cathode ray tube. The switch is responsive to interruption of current from the power supply to maintain conduction in the tube to discharge energy stored therein.

This invention relates to cathode ray tube protective circuits and in particular to protective circuits for preventing damage to the flourescent screen of a cathode ray tube.

During the operation of a cathode ray tube, such as may be used as the picture tube in a television set, a charge is stored on the second anode and in the capacitors coupling the video information to the tube. If the supply voltages are removed from the tube, for example in turning off the television set, electrons due to these charges are attracted from the still hot cathode to the fluorescent screen. With the removal of power the horizontal and vertical sweeps cease and the electron beam is focused on one portion of the fluorescent screen. Thus the electron beam can be maintained in one spot for an appreciable period of time after removal of the tube voltages, because of the lack of sweep and energy stored in the cathode and the second anode. The energy in the electron beam applied to one portion of the fluorescent screen causes the fluorescent material to become heated and damaged.

Prior circuits for eliminating this problem have used the energy stored in the power supply to bias off the tube while the cathode is cooled. In television sets incorporating transistor circuits it may not be feasible to store energy for the length of time necessary to allow the cathode to cool, because of the low impedance of the transistor circuits. Other protection circuits use the television set on-off switch to operate the protective circuit. When the on-off switch is not used to operate the set, as for example, when the set is turned off by a timer, the protective circuit will not be operative to protect the cathode ray tube.

It is, therefore, an object of this invention to provide a cathode ray tube with a magnetic reed switch operated damage to the fluorescent screen after power is removed from the cathode ray tube.

Another object of this invention is to provide a cathode ray tube with a circuit to discharge rapidly the energy stored in the tube and associated circuitry, before complete collapse of the sweep, to prevent damage to the fluorescent screen of the tube.

A feature of this invention is the provision of a cathode ray tube with a circuit for biasing the tube to maintain conduction after power is removed to discharge rapidly the energy stored in the tube.

Another feature of this invention is the provision of a cathode ray tube with a magnetic reed switch operated by the filter choke to couple the cathode to the grid, when power is removed from the cathode ray tube, thereby biasing the cathode ray tube on and rapidly discharging energy stored therein.

The invention is illustrated in the drawing, a partial schematic and partial block diagram of a television system incorporating this invention.

In practicing this invention a cathode ray tube is provided with means for maintaining a bias on the tube when the power supplied thereto is interrupted. The bias is sufficient to maintain conduction in the tube, so that energy stored in the tube is discharged before the sweep field collapses. An example of a means for maintaining the bias on the tube would be a magnetic reed switch which couples the cathode to the grid when power is removed from the tube by de-energizing the power supply. The reed switch used in the circuit is magnetically coupled to the filter choke of the power supply system of the device incorporating the cathode ray tube. The magnetic field produced by the filter choke, when current is flowing therethrough, opens the magnetic switch allowing the tube to operate in a normal manner. When current ceases flowing through the filter choke for any reason, the magnetic field produced by the filter choke is removed from the reed switch and it closes. When the reed switch is closed, the potential between the cathode and the grid of the cathode ray tube is zero and the tube is biased to maintain conduction therein so that the energy stored in the tube is rapidly discharged before the sweep collapses completely and damage to the flourescent screen is prevented.

Referring to the illustration, a television signal is received by antenna 10 and processed in a known manner by transistorized television receiver 11 to produce video and sweep signals. The video signal is coupled to cathode ray picture tube 15 by coupling capacitor 17 and the parallel combination of inductance 19 and resistor 18. A brightness control 13 to set the normal picture tube bias is in the form of a potentiometer connected across a voltage source with a variable arm coupled through isolation resistor 12 to the junction of capacitor 17 and peaking inductor 19. High voltage for the second anode 21 is supplied from television receiver 11 in a known manner, e.g., from the horizontal sweep system. The sweep signals are coupled to yoke 22 to sweep the electron beam across the flourescent screen 24 of tube 15.

A low voltage supply for supplying B+ voltage to the television receiver consists of a wall plug 23 which couples the receiver to the alternating current supply. Wall plug 23 is coupled to the primary 27 of transformer 28 through on-off switch 25 and circuit breaker 26. The secondary 29 of transformer 28 is coupled to rectifiers 30 forming a full wave rectifier system. The direct current output of the rectifier is coupled to voltage regulator 35 through a filter consisting of capacitor 32 and filter choke 33.

The charge stored on the second anode 21 of cathode ray tube 15 attracts electrons from the hot cathode 16 causing the electrons to strike fluorescent screen 24. When cathode ray tube 15 is in normal operation the electron beam is swept over fluorescent screen 24 rapidly so that the energy in the beam is not dissipated at one point on the screen. However, when the B+ voltages are no longer present the sweep collapses and the electron beam is concentrated at one position on screen 24 until the cathode cools or the second anode and capacitor 17 are discharged. This amount of energy directed at one position on the cathode ray tube screen 24, for possibly as much as 30 seconds , may be sufficient to burn screen 24 and damage the tube.

In order to prevent this damage a circuit for substantially discharging second anode 21 before the sweep has collapsed is provided. The circuit includes a magnetic reed switch 39 coupling cathode 16 to ground. Control grid 20 is also coupled to ground through resistance 14. When magnetic switch 39 is closed, the potential between cathode 16 and control grid 20 is zero causing the cathode ray tube to be biased fully on. Since switch 39, when closed, permits current to flow from cathode 16 to anode 21 without flowing through resistors 12 and 13, the flow of current through the tube increases. The resulting heavy flow of current in cathode ray tube 15 substantially discharges second anode 21 and capacitor 17 before the sweep collapses completely, thereby preventing damage to screen 24 of cathode ray tube 15.

Magnetic switch 39 is a normally open switch and is placed within the magnetic field of filter choke 33. A magnet 38 is placed so its field will be applied to magnetic switch 39 causing magnetic switch 39 to be magnetically biased to a closed position. When current flows through filter choke 33 the magnetic field generated thereby overcomes the bias of permanent magnet 38 causing magnetic switch 39 to open, disconnecting cathode 16 from grid 20. If current ceases flowing through filter choke 33 for any reason, the magnetic bias developed by filter choke 33 and applied to magnetic switch 39 will be removed causing magnetic switch 39 to close. The magnetic switch, when closed, will bias the cathode ray tube to maintain conduction therein as previously described.

We claim:

1. A cathode ray tube circuit having energy storage means connected to the tube which produce undesirable beam current upon discharge thereof, including in combination, a bias circuit connected to the tube and having a first bias condition associated with reproduction of desired images by the tube and a second bias condition for increasing the beam current in the tube beyond the current associated with the first bias condition, a power supply circuit to supply energizing current for said circuit, and means operative in the absence of current from said power supply circuit for changing said bias circuit from said first condition to said second condition whereby the beam current in the tube is increased to rapidly discharge the energy storage means.

2. An image reproducing system including in combination, a cathode ray tube having a cathode and an anode, energy storage means coupled to said cathode ray tube and subject to produce undesirable beam current in said tube upon discharge thereof, deflection means for producing a field for sweeping an electron beam in said cathode ray tube, power supply means for energizing the system including connections to said cathode ray tube and said deflection means, said deflection means being responsive to the interruption of current from said power supply means to cause said field to collapse, a switching circuit coupled between the cathode of the cathode ray tube and a reference potential and including means coupled to the power supply means which is responsive to the interruption of current from said power supply means for closing said switching circuit and thereby biasing said cathode ray tube so that conduction therein is maintained sufficient to discharge said energy storage means before said collapse of said field.

3. A protection system for a cathode ray tube having a cathode and a control grid and used in an electronic system, including in combination, a power supply coupled to the electronic system and to the cathode ray tube to provide an operating current therefor, bias supply means coupled to said power supply and to the grid and cathode for establishing a first bias potential therebetween, switch means operated by said power supply and electrically coupled to the grid and cathode, said switch means being responsive to the interruption of said current to be closed to establish a second bias potential between the grid and cathode whereby the cathode ray tube is biased to maintain conduction so that energy stored therein is rapidly discharged.

4. A protection system for a cathode ray tube having a cathode and a control grid and used in an electronic system, including in combination, a power supply, magnetic field generating means coupling said power supply to the electronic system and to the cathode ray tube to provide an operating current therefor, said magnetic field generating means being responsive to said current to generate a magnetic field thereabout, bias supply means coupled to said power supply and to the grid and cathode for establishing a first bias potential therebetween, switch means electrically coupled to the grid and cathode and magnetically coupled to said magnetic field generating means, said switch means being responsive to the interruption of said magnetic field to establish a second bias potential between the grid and cathode whereby the cathode ray tube is biased to maintain conduction so that energy stored therein is rapidly discharged.

5. A protection system for a cathode ray tube having a cathode and a control grid and used in an electronic system, including in combination, a power supply coupled to the electronic system and to the cathode ray tube to provide an operating current therefor and including filter choke means having said current flowing therethrough, said choke means being responsive to said current to generate a magnetic field thereabout, bias supply means coupled to said power supply and to the grid and cathode for establishing a first bias potential therebetween, magnetic switch means magnetically coupled to said choke means and electrically coupling the grid to the cathode, said switch means being responsive to the interruption of said magnetic field to establish a second bias potential between the grid and cathode whereby the cathode ray tube is biased to maintain conduction so that energy stored therein is rapidly discharged.

6. In a television receiver having a cathode ray tube with a cathode, a control grid and an anode, a power supply to furnish operating current for the receiver, a protection system for the cathode ray tube including in combination; bias supply means coupled to the power supply and to the cathode and the control grid and including a switching device having a pair of terminals coupled between the grid and the cathode, said switching device including switch control means coupled to the power supply and responsive to the presence of operating current to open said switching device to cause said bias supply means to provide an operating bias potential for the cathode ray tube, said control means being responsive to interruption of the operating current to close said switching device to cause said bias supply means to provide a bias potential between the grid and cathode to maintain cathode to anode conduction in the cathode ray tube to discharge energy stored on the anode.

7. In a television receiver having a cathode ray tube with a cathode and a control grid, a receiver circuit to couple video signals to the cathode ray tube, deflection means for producing a field for sweeping an electron beam in the cathode ray tube, a power supply to furnish operating current for the receiver circuit, the cathode ray tube and the deflection means, the deflection means being resopnsive to interruption of operating current to cause the field to collapse, a bias supply circuit for the cathode ray tube coupled between the cathode and the grid and including in combination, a brightness control potentiometer coupled to the cathode and the power supply to permit selection of bias on the cathode ray tube, a switching device having a pair of terminals coupled between the grid and the cathode, said switching device including switch control means coupled to the power supply and responsive to the presence of operating current to establish said switching device in a first condition and cause said bias supply means to provide an operating bias potential between the grid and cathode, said control means being responsive to interruption of the operating current to establish said switching device in a second condition to cause said bias supply circuit to provide a bias potential between the grid and cathode to maintain conduction in the cathode ray tube to substantially discharge energy stored therein before collapse of the field.

References Cited

UNITED STATES PATENTS

| | | | |
|---|---|---|---|
| 2,810,858 | 10/1957 | Stein et al. | 315—20 |
| 3,112,425 | 11/1963 | Theisen | 315—30 |
| 3,146,372 | 8/1964 | Fertig | 315—20 |

FOREIGN PATENTS

| | | |
|---|---|---|
| 836,217 | 6/1960 | Great Britain. |
| 1,127,004 | 4/1962 | Germany. |
| 1,160,002 | 12/1963 | Germany |

JOHN W. CALDWELL, *Acting Primary Examiner.*

DAVID G, REDINBAUGH, *Examiner.*

T. A. GALLAGHER, R. K. ECKERT, *Assistant Examiners.*